(12) United States Patent
Nold, III

(10) Patent No.: US 6,382,595 B1
(45) Date of Patent: May 7, 2002

(54) DIFFERENTIAL HYDROSTATIC TRANSMISSION SYSTEM

(75) Inventor: Raymond V. Nold, III, Round Rock, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 2 days.

(21) Appl. No.: 09/626,095

(22) Filed: Jul. 26, 2000

(51) Int. Cl.$^7$ ............................................... B66D 1/08
(52) U.S. Cl. ........................... 254/361; 60/327; 60/427
(58) Field of Search .......................... 254/361; 60/327, 60/395, 403, 427, 494, 905

(56) References Cited

U.S. PATENT DOCUMENTS

| | | | |
|---|---|---|---|
| 3,698,690 A | * 10/1972 | Beaver | 254/361 |
| 3,771,310 A | * 11/1973 | Cryder et al. | 60/427 |
| 4,425,759 A | * 1/1984 | Krusche | 60/420 |
| 4,516,755 A | * 5/1985 | Uchimura | 254/361 |
| 4,527,393 A | * 7/1985 | Young | 60/327 |
| 4,545,203 A | * 10/1985 | Deininger et al. | 60/468 |
| 4,870,819 A | * 10/1989 | Walzer | 60/422 |
| 5,048,295 A | * 9/1991 | Hoscheler | 60/461 |
| 5,355,675 A | 10/1994 | Mayhugh et al. | |
| 5,447,029 A | * 9/1995 | Swick et al. | 60/492 |
| 5,540,048 A | * 7/1996 | Larkin et al. | 60/327 |
| 6,164,627 A | * 12/2000 | Ravellini | 254/361 |

* cited by examiner

*Primary Examiner*—Emmanuel M. Marcelo
(74) *Attorney, Agent, or Firm*—Adenike A. Adewuya; Brigitte L. Jeffery; Wayne I. Kanak

(57) ABSTRACT

A hydrostatic transmission system for driving a rotatable member includes a differential having an output coupled with the rotatable member, a first hydrostatic drive having an output coupled to a first input of the differential, and a second hydrostatic drive having an output coupled to a second input of the differential. The output of the first hydrostatic drive is rotatable in a first selected direction and at a first selected speed. The output of the second hydrostatic drive is rotatable in a second selected direction and at a second selected speed. A rotational speed and direction of the output of the differential is related to the algebraic sum of the rotational speeds and directions of the outputs of the hydrostatic drives. In one embodiment, the speeds of the first and second drives are maintained above a minimum stable threshold, while operating the rotatable drive at very low or zero speed, by selecting the first direction to be opposite the second direction.

28 Claims, 8 Drawing Sheets

DIFFERENTIAL HYDROSTATIC TRANSMISSION SYSTEM

BACKGROUND OF THE INVENTION

1. Field of the Invention

The invention relates to hydrostatic transmission systems and use of such a hydrostatic transmission system in powering a winch.

2. Background Art

Well logging involves recording data related to one or more characteristics of subterranean formations penetrated by a borehole. Many types of well logs are recorded by appropriate downhole instruments placed in a housing called a sonde. In wireline-conveyed well logging, the sonde is lowered into the borehole by means of an armored electrical cable wound on the drum of a winch. The measurements are made as the sonde passes the various formations, and data signals are transmitted through the cable to an acquisition system at the earth's surface. Generally, the sonde can be lowered quickly into the borehole and retrieved quickly from the borehole when it is not acquiring data. However, the physics and design of some well logging instruments require that the sonde be moved precisely inside the borehole, usually at a low speed, while acquiring data. A drive system is used to drive the winch drum so that the cable to which the sonde is attached can be payed out or retrieved at desired speeds. Typically, the drive system includes a prime mover, such as an internal combustion engine, and a hydrostatic transmission system for transmitting power from the prime mover to the winch drum.

Conventional hydrostatic transmission systems include a hydraulic pump, usually a variable-displacement hydraulic pump, and a hydraulic motor, usually a variable-displacement hydraulic motor. The hydraulic pump transfers power from the prime mover to the hydraulic motor, and the hydraulic motor in turn applies a torque to the winch drum. In operation, the prime mover is typically set to operate at a predetermined speed via an engine throttle or the like. The speed of the winch drum is then regulated by controlling the displacements of one of the hydraulic elements of the hydrostatic transmission system. Conventional hydrostatic transmission systems, however, tend to become unstable when the flow rate of the hydraulic pump and the rotational speed of the hydraulic motor are reduced to accommodate very low drum speeds. Such instability may affect the quality of the measurements made by the logging instrument as well as degrade the service performance of the hydrostatic transmission system. As a result, logging speeds have typically been limited to the stable range of the hydrostatic transmission system.

Several solutions have been proposed for overcoming instability of the hydrostatic transmission system at low speeds. For example, U.S. Pat. No. 5,355,675 issued to Mayhugh et al. discloses a stable closed hydrostatic rotary power transmission system which can be used to transmit power from an engine to a winch. The hydrostatic rotary power transmission system disclosed in the Mayhugh et al '675 patent has a wide dynamic speed control range and includes a hydrostatic motor, a variable-displacement hydraulic pump, and a two-position control device. The transmission system may operate in one of two modes: normal mode and fine-speed control mode. In the normal mode, the two-position control device interconnects the pump with the motor through a first circuit, and the operation of the motor speed is a function of the displacement of the pump. In a fine speed control mode, the two-position control device disables the first circuit configuration and interconnects the pump with the motor through a second circuit. In this mode, the motor speed is a function of the flow rate through a proportional-flow valve downstream of the motor.

SUMMARY OF THE INVENTION

One aspect of the invention is a hydrostatic transmission system for driving a rotatable member, which includes a differential having an output rotatably coupled with the rotatable member. The hydrostatic transmission system further includes a first hydrostatic drive operatively coupled to a first input of the differential and a second hydrostatic drive operatively coupled to a second input of the differential. The output of the first hydrostatic drive is rotatable in a first selected direction and at a first selected speed, the output of the second hydrostatic drive is rotatable in a second selected direction and at a second selected speed. A rotational speed and direction of the output of the differential is related to the algebraic sum of the rotational speeds and directions of the outputs of the two hydrostatic drives.

Another aspect of the invention is a method for driving a rotatable member which includes controlling a first hydrostatic drive to a first input of a differential at a selected speed in a first selected direction, and controlling a second hydrostatic drive to rotate a second input of a differential at a second selected speed and in a second selected direction. The first and second speeds and directions are selected to provide a selected output speed and rotation direction of the differential, and consequently, the rotatable member, which is rotatably coupled to the output of the differential.

Another aspect of the invention is a winch system which comprises a rotatably supported drum, a differential having an output coupled to the rotatably supported drum, a first hydrostatic drive having an output coupled to a first input of the differential, and a second hydrostatic drive having an output coupled to a second input of the differential. The output of the first hydrostatic drive is rotatable in a first selected direction, the output of the second hydrostatic is rotatable in a second selected direction, and a rotational speed of the output of the differential is related to algebraic sum of the rotational speeds and directions of the output of the hydrostatic drives.

Other aspects and advantages of the invention will be apparent from the following description and the appended claims.

DETAILED DESCRIPTION OF THE INVENTION

Figure 1:
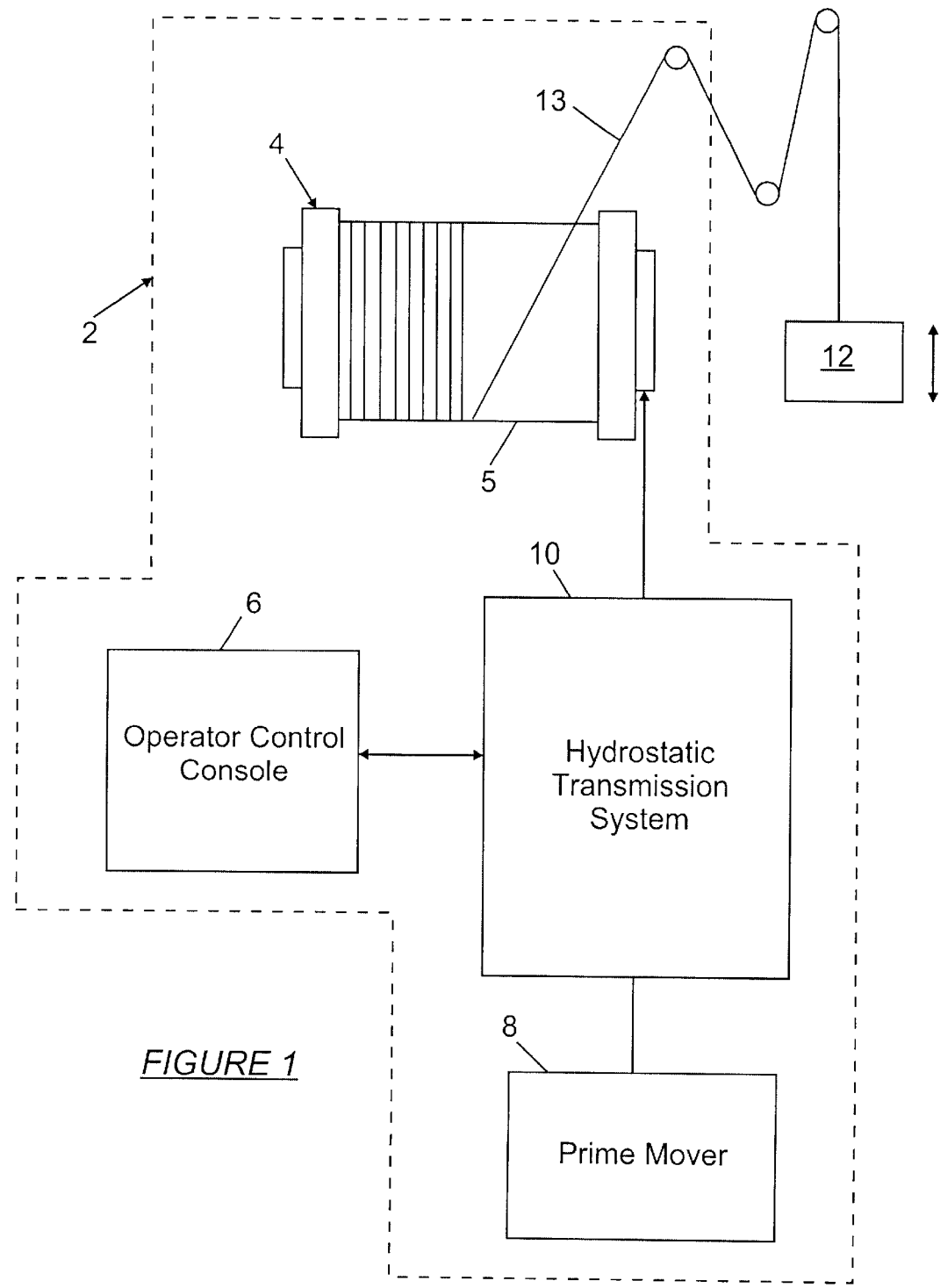
FIG. 1 is a block diagram of a winch system.

Various embodiments of the invention will now be described with reference to the accompanying figures. FIG.

1 is a block diagram of a winch system 2 which includes a winch 4 having a rotatably supported winch drum 5, an operator control console 6, a prime mover 8, for example, a diesel engine, and a hydrostatic transmission system 10. The winch 4 is used to move a load 12. In well logging, the load 12 could be a sonde, for example. The load 12 would be attached to the end of a cable 13 that is wound on the winch drum 5. When the winch drum 5 is rotated, the cable 13 is either extended or retrieved, depending on the direction of rotation of the winch drum 5. The speed at which the winch drum 5 rotates is controllable from the operator control console 6. The hydrostatic transmission system 10 delivers power from the prime mover 8 to the winch drum 5 in response to control signals from the operator control console 6 to drive the winch drum 5 in the selected direction and at the selected speed.

Figure 2:
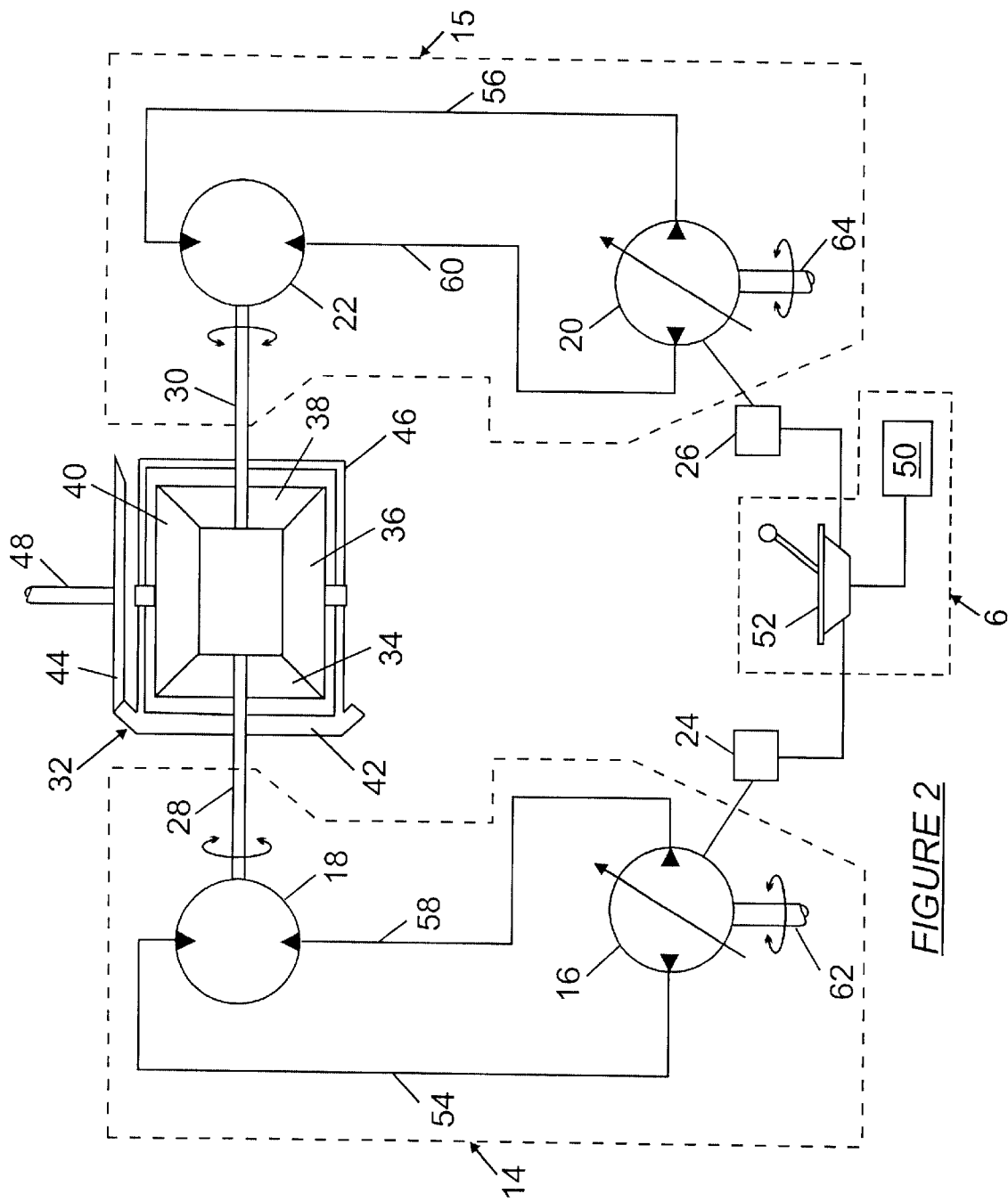
FIG. 2 is a circuit diagram of a hydrostatic transmission system according to one embodiment of the invention.

FIG. 2 shows an hydraulic circuit diagram for the hydrostatic transmission system 10 according to one embodiment of the invention. The hydrostatic transmission system 10 includes two closed-loop hydrostatic drive circuits 14, 15. Closed-loop hydrostatic drive circuit 14 includes an hydraulic pump 16 and an hydraulic motor 18. Closed-loop hydrostatic drive circuit 15 in this example also includes an hydraulic pump 20 and an hydraulic motor 22. Various types of hydraulic pumps are known in the art. See, for example, Sullivan, James A., *Fluid Power: Theory and Applications,* Prentice-Hall, Inc. (1998). The hydraulic pumps 16, 20 may be positive-displacement type. Positive-displacement hydraulic pumps transfer a substantially constant volume of fluid for each cycle of operation. More preferably, the hydraulic pumps 16, 20 are "variable-displacement" pumps. A variable displacement pump is one in which the displacement volume per cycle of the pump's operation can be adjusted. Various types of variable-displacement pumps are known in the art. One common design uses a swash plate to adjust the volumetric flow rate of the pump. The volumetric flow rate is adjusted by changing the angle of the swash plate, either mechanically or by the action of a yoke-actuating piston, for example.

The adjustment of the internal mechanisms, e.g., swash plates (not shown), which control the volumetric flow rates of the hydraulic pumps 16, 20 are controlled in this embodiment by actuatable electronic displacement controls 24, 26, which in this embodiment, for example, are displacement solenoids. Preferably, the hydraulic pumps 16, 20 include means for controlling their output flow in either direction, i.e., means for reversing the suction and discharge ports on the pump. Reversing valves (not shown) may also be used to change the flow direction of either or both of the pumps 16, 20. The hydraulic motors 18, 22 receive pressurized fluid from the hydraulic pumps 16, 20 and convert the energy in the pressurized fluid to the turning motion of motor output shafts 28, 30, respectively. The hydraulic motors 18, 22 rotate the respective output shafts 28, 30 in either direction, i.e., forward or reverse, depending on direction of fluid flow through the motor. Hydraulic motors are available as either fixed- or variable-displacement units so that speed variation with rotation in either direction is possible even with a fixed volumetric flow rate through the motor. Various hydraulic motor designs are known in the art. See, for example, Sullivan, James A., *Fluid Power: Theory and Applications,* supra.

The output shafts 28, 30 of the hydraulic motors 18, 22 are coupled to respective inputs of a differential 32. In one embodiment, the differential 32 comprises bevel gears 34–40. The shafts 28 and 30 are coupled to input bevel gears 34 and 38, respectively. The differential 32 also includes bevel gears 42 and 44. Gears 42 and 44 can also be hypoid gears. Accordingly, the form of the gears is not meant to limit the invention. A carrier 46 is attached to bevel gear 42 and is coupled to bevel gears 36 and 40. The rotary motion of the motor output shafts 28 and 30 is transmitted to bevel gears 36 and 40 by differential input bevel gears 34 and 38. The rotary motion of bevel gears 36 and 40 is in turn transmitted to the bevel gear 42 through the carrier 46. Finally, the motion of bevel gear 42 is transmitted to the bevel gear 44. An output shaft 48 is coupled to the bevel gear 44 so as to turn with the bevel gear 44. The output shaft 48 transmits the torque necessary to rotate the winch drum 5 (shown in FIG. 1). The speed of the output shaft 48 is determined by the configuration of the gears in the differential 32 and the speed and rotation direction of the motor output shafts 28, 30. The speed of the differential output shaft 48 can be controlled by appropriately selecting the speed and direction of rotation of each of the motor output shafts 28, 30. The differential 32 could be configured differently from what is shown in the drawing, as well known in the art. For example, the differential 32 could consist of a train of planetary gears or other types of gears. Accordingly, the form of the differential shown in FIG. 2 is not meant to limit the scope of the invention.

The differential 32 can operate, for purposes of explaining its output speed, in a "differential mode" or a "summation mode". At the operator control console 6, an operator may use a mode selector 50 to select the mode. Selection of the mode in one example consists of selecting the direction of rotation of each of the hydraulic motors 18, 22. As will be further explained, the speed and direction of rotation of each of the motors depends on the desired rotation speed of the winch drum (5 in FIG. 1). Based on the selected mode, the operator may then use a control device 52, e.g., a joystick controller, to control the operation of the hydraulic pumps 16, 20. The control device 52 sends a signal to the electronic displacement controls 24, 26, which then control the internal mechanisms in the hydraulic pumps 16, 20, respectively, so that the desired amount of fluid is pumped out of the hydraulic pumps 16, 20. The pressurized fluid pumped out of the hydraulic pumps 16, 20 flows through conduits 54, 56, respectively, to the hydraulic motors 18, 22, thereby providing power to the hydraulic motors 18, 22. The hydraulic motors 18, 22 convert the energy in the pressurized fluid to rotary motion of the motor output shafts 28, 30, as previously explained. The fluid pumped to the hydraulic motors 18, 22 returns to the inlet manifolds of the hydraulic pumps 16, 20 through conduits 58, 60, respectively.

Figure 3:
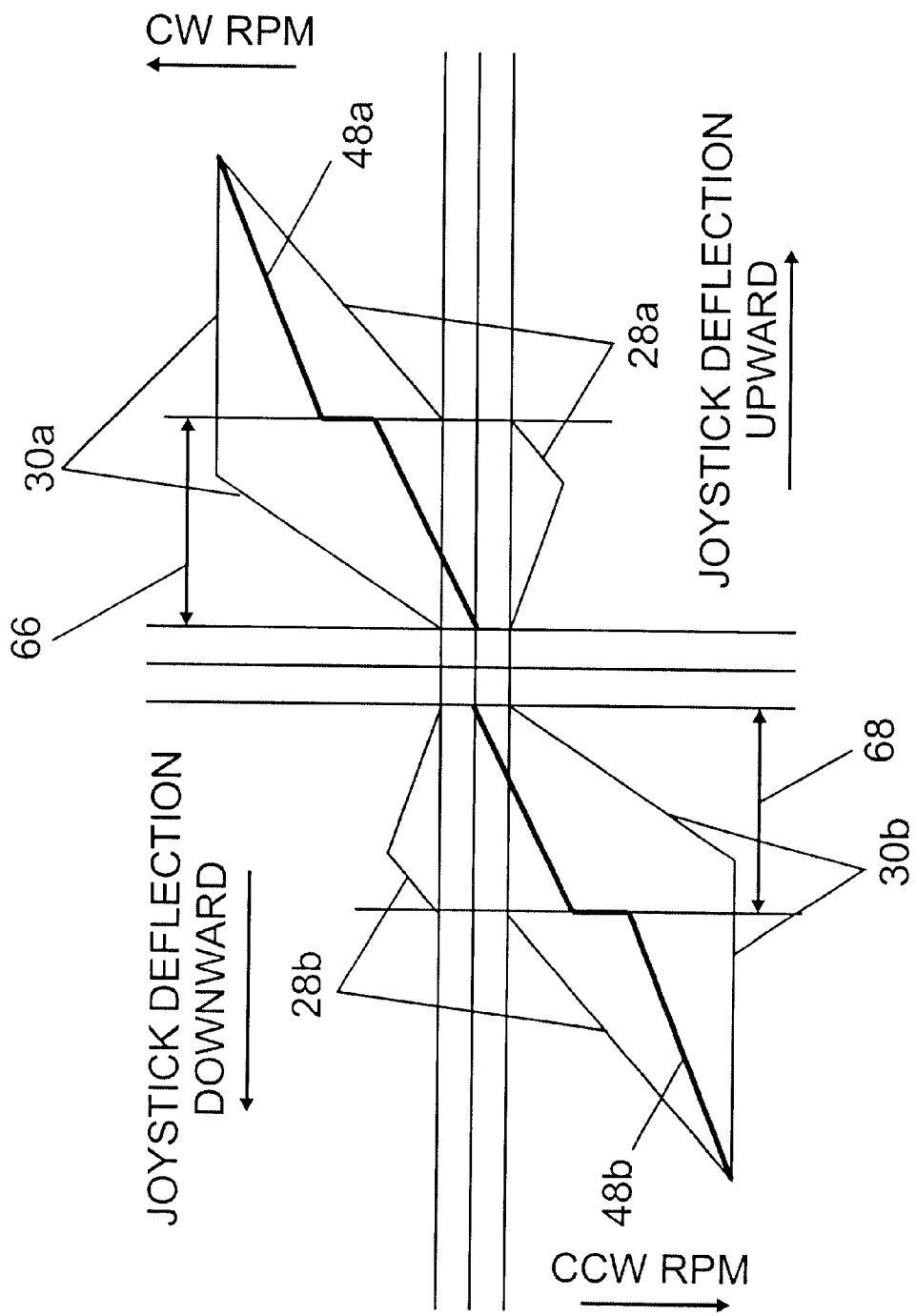
FIGS. 3 and 4 show examples of control graphs used to control the hydrostatic transmission system shown in FIG. 2.
Figure 4:
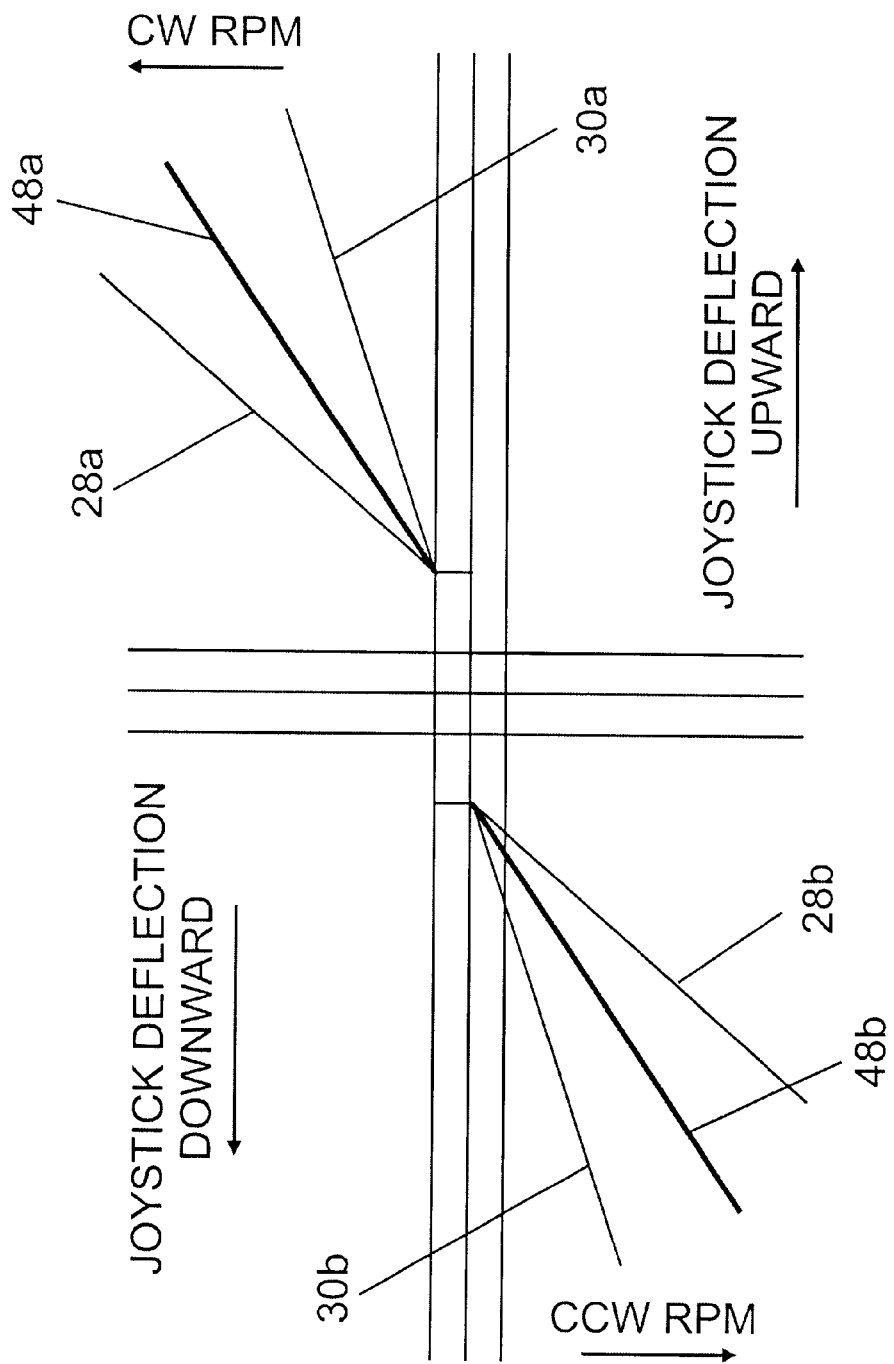

The rotation speed and direction of the differential output shaft 48 is related to the algebraic sum of the proportional speeds of the motor output shafts 28, 30. The term proportional is used because the speed of the differential output shaft 48 depends on the gear configuration, e.g., the number of teeth on the gears 32–38 which transmit the motion of the input shafts 28, 30 to the output shaft 48. If the motor output shafts 28 and 30 are rotating to turn their associated differential input gears in the same direction, the speed of the differential output shaft 48 will be related to the sum of the speeds of the motor output shafts 28 and 30. On the other hand, if the motor output shafts 28 and 30 are rotating in opposite directions, the speed of the differential output shaft 48 is the related to the difference between the speeds of the input shafts 28 and 30. Algebraically, a sign (positive or negative) can be arbitrarily assigned to the rotation speed of each of the motor output shafts to describe which direction the associated differential input gear is being rotated. FIGS. 3 and 4 show examples of control graphs which show the individual speeds of the hydrostatic drive circuits 14, 15, i.e., the speeds of the motor output shafts 28, 30, in the differential and summation mode, respectively, to achieve substantially infinite variability of the differential output shaft 48 speed, from full speed down (paying out the cable on the winch drum), through and including zero, to full speed up (reeling in the cable onto the winch drum).

The control graph shown in FIG. 3 is for the differential mode. For the example shown in FIG. 3, the transmission system is set up such that the load 12 (shown in FIG. 1) attached to the cable 13 (shown in FIG. 1) on the winch drum 5 (shown in FIG. 1) travels in the upward direction (out of a wellbore) when the rotation motor output shaft 28 (shown in FIG. 2) is clockwise, and travels in the downward direction (into the wellbore) when the rotation of motor output shaft 28 (shown in FIG. 2) is counterclockwise. In FIG. 3, curves 28a, 28b represent the speeds of motor output shaft 28 (shown in FIG. 2), curves 30a, 30b represent the speeds of motor output shaft 30 (shown in FIG. 2), and curves 48a, 48b represent the speeds of the differential output shaft 48 (shown in FIG. 2). The speed curve 48a is the resultant of the speed curves 28a and 30a, and the speed curve 48b is the resultant of the speed curves 28b and 30b. In the differential zone 66, motor output shaft 28 (shown in FIG. 2) rotates in the counterclockwise direction, as shown by the portion of the curve 28a within the differential zone 66, and motor output shaft 30 (shown in FIG. 2) rotates in the clockwise direction, as shown by the portion of the curve 30a within the differential zone 66. Similarly, in the differential zone 68, motor output shaft 28 (shown in FIG. 2) rotates in the clockwise direction, as shown by the portion of the curve 28b within the differential zone 68, and the motor output shaft 30 (shown in FIG. 2) rotates in the counterclockwise direction, as shown by the portion of the curve 30b. In the differential zones 66, 68, the speed 48a, 48b of the differential output shaft 48 (shown in FIG. 2) is determined by the difference between the speed 28a, 28b of motor output shaft 28 (shown in FIG. 2) and the speed 30a, 30b of the motor output shaft 30 (shown in FIG. 2), respectively.

The control graph shown in FIG. 4 is for the summation mode. In the summation mode, the motor output shafts 28 and 30 (shown in FIG. 2) both rotate their respective differential input gears in the same direction, regardless of the direction in which the load 12 (shown in FIG. 1) is traveling. In this example, the transmission system is set up such that the load 12 (shown in FIG. 1) travels in the upward direction when the rotation of motor output shaft 28 (shown in FIG. 2) and the rotation of motor output shaft 30 (shown in FIG. 2) are both clockwise. The load 12 (shown in FIG. 1) travels in the downward direction when the rotation of motor output shaft 28 and the rotation of the motor output shaft 30 are counterclockwise. In FIG. 4, curves 28a, 28b represent the speeds of motor output shaft 28 (shown in FIG. 2), curves 30a, 30b represent the speeds of motor output shaft 30 (shown in FIG. 2), and curves 48a, 48b represent the speeds of the differential output shaft 48 (shown in FIG. 2). The speed curve 48a is the resultant of the speed curves 28a and 30a, and the speed curve 48b is the resultant of the speed curves 28b and 30b. In the summation mode, the speed 48a, 48b of the differential output shaft 48 (shown in FIG. 2) is determined by the sum of the speed 28a, 28b of motor output shaft 28 and the speed 30a, 30b of motor output shaft 30 (shown in FIG. 2), respectively. The summation mode does not generally provide for a zero speed at the differential output shaft 48 (shown in FIG. 2), unless the motor output shafts 28 and 30 (shown in FIG. 2) both have zero speeds, i.e., the hydraulic motors 18, 22 (shown in FIG. 2) are turned off. When it is desired to obtain very low speeds or zero speed, the differential mode is the more appropriate mode of operation. Referring to FIG. 2, it should be noted that the control device 52 is used to control the direction in which the motor output shafts 28, 30 are rotating. The control device 52 sends signals to the hydraulic pumps 16, to reverse flow direction. This reverse in flow direction is communicated to the hydraulic motors 18, 22. Alternatively, as previously explained, the flow direction through each of the motors 18, 22 can be selected using a reversing valve (not shown).

The hydrostatic transmission system described above provides certain advantages over prior art hydrostatic drive systems, especially when used in wireline-conveyed well logging. One advantage is that the transmission system allows the speed of the winch drum 5 (shown in FIG. 1) to be precisely controlled, particularly at very low rotation speeds, by operating the transmission system in the differential mode. When the logging sonde is acquiring data, however, using the differential mode makes it possible to move the sonde at very low speeds, even at zero speed, while operating the motors 18, 22 (shown in FIG. 2) above their individual minimum stable speed limits. Because the motors 18, 22 (shown in FIG. 2) can operate above their individual minimum stable speeds limits while achieving very low differential output (and consequently winch drum) speeds, a region of instability of prior art winch drive hydraulic transmission systems can be avoided. When the logging sonde is not acquiring data, for example, the transmission system can operated in the summation mode so that the logging sonde can be lowered into the borehole or retrieved from the borehole very quickly.

Figure 5:
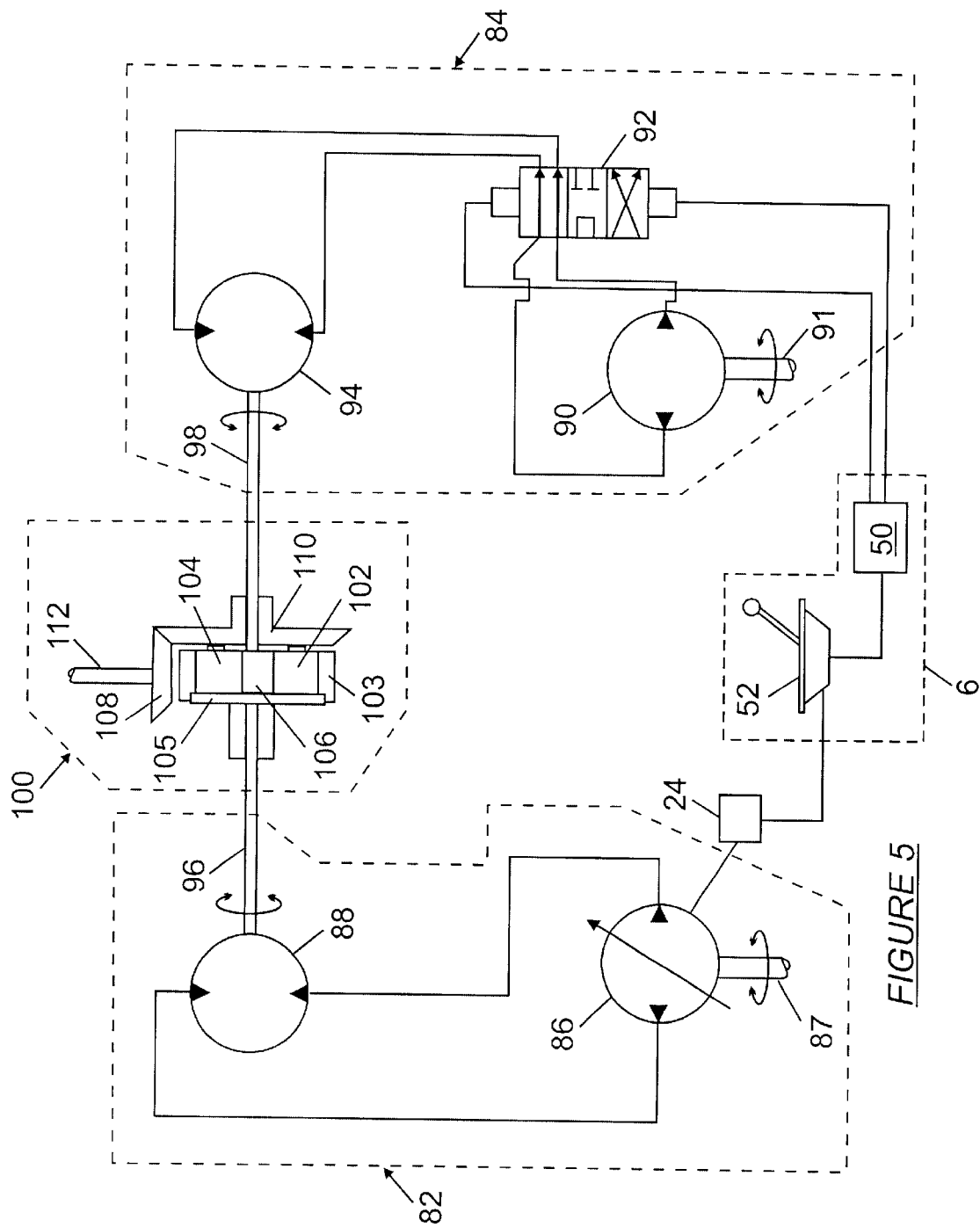
FIG. 5 is a circuit diagram of a hydrostatic transmission system according to another embodiment of the invention.

The hydrostatic transmission system shown in FIG. 2 illustrates one embodiment of a differential hydrostatic drive system which can be used to power a winch. There are various other configurations of hydrostatic drive circuits and gearing that can be used in the hydrostatic transmission system according to the invention which will provide similar results to the ones described above. FIG. 5 shows a circuit diagram for an hydrostatic transmission system in accordance with another embodiment of the invention. The hydrostatic transmission system in this embodiment includes a closed-loop hydrostatic drive circuit 82 and an open-loop hydrostatic drive circuit 84. The closed-loop hydrostatic drive circuit 82 includes an hydraulic pump 86 and an hydraulic motor 88. The closed-loop hydrostatic drive circuit 82 is similar to the previously described closed-loop hydrostatic drive circuits (14, 16 in FIG. 2) of the first embodiment. The open-loop hydrostatic drive circuit 84 includes an hydraulic pump 90, a directional control valve 92, and an hydraulic motor 94 which can be, for example, a gear motor. The directional control valve 92 controls the direction of fluid flowing from the hydraulic pump 90 to the hydraulic motor 94. In this embodiment, the hydraulic pump 90 is preferably a fixed-displacement pump, e.g., a hydraulic gear pump, although a variable-displacement pump can also be used. The directional control valve 92 receives control signals from the mode selector 50. The hydraulic pump 86 receives control signals from the control device 52. The input shafts 87, 91 of the hydraulic pumps 80, 90, respectively, may be coupled to the prime mover 8 (shown in FIG. 1).

Figure 6:
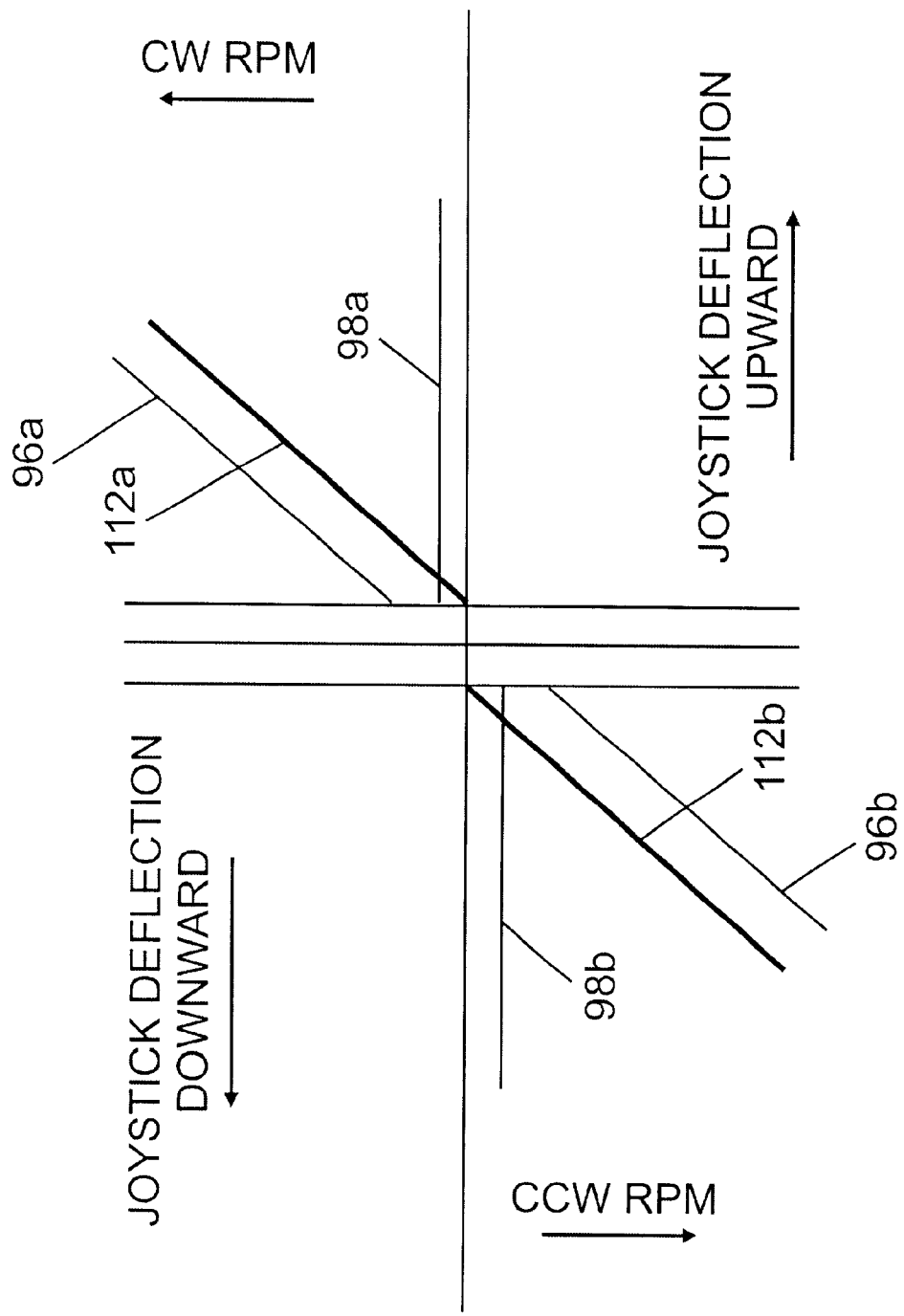
FIG. 6 shows an example of a control graph for the hydrostatic transmission system shown in FIG. 5.

The output shafts 96, 98 of the motors 88, 94, respectively, are coupled to the inputs of a differential 100. In this embodiment, the differential 100 includes planetary gears 102, 104 which rotate about their respective axes and about a sun gear 106. The sun gear 106 is coupled to the shaft 98 of the motor 94. Ring gear 103, is rotationally coupled by carrier 105 to the output shaft 96 of motor 88. Planetary gears 102, 104 are coupled to the bevel gear 110. The motion of bevel gear 110 is coupled to bevel gear 108, which transmits its motion to differential output shaft 112. The planetary style differential allows different input ratios for the closed-loop hydrostatic drive circuit and the open-loop hydrostatic drive circuit. This arrangement compensates for the pressure, torque, and speed performance differences between the two types of drives 82, 84. FIG. 6 shows an example of a control graph describing the individual speeds of the hydrostatic drive circuits 82, 84, i.e., the speeds of the shafts 96, 98, in differential mode. Curves 96a, 96b represent the speeds of motor output shaft 96, curves 98a, 98b represent the speeds of motor output shaft 98, and curves 112a, 112b represent the speeds of the differential output shaft 112. The speed curve 112a is the resultant of the speed curves 96a and 98a, and the speed curve 112b is the resultant of the speed curves 96b and 98b. The speed 98a (98b) of motor output shaft 98 (shown in FIG. 5) is maintained substantially constant while the speed 96a (96b) of motor output shaft 96 (shown in FIG. 5) in this embodiment is adjusted to control the speed 112a (112b) of the output shaft 112 (shown in FIG. 5). In the control graph shown in FIG. 6, the motor output shafts 96 and 98 (shown in FIG. 5) rotate in the same direction, regardless of the direction in which the load (12 in FIG. 1) is traveling.

Figure 7:
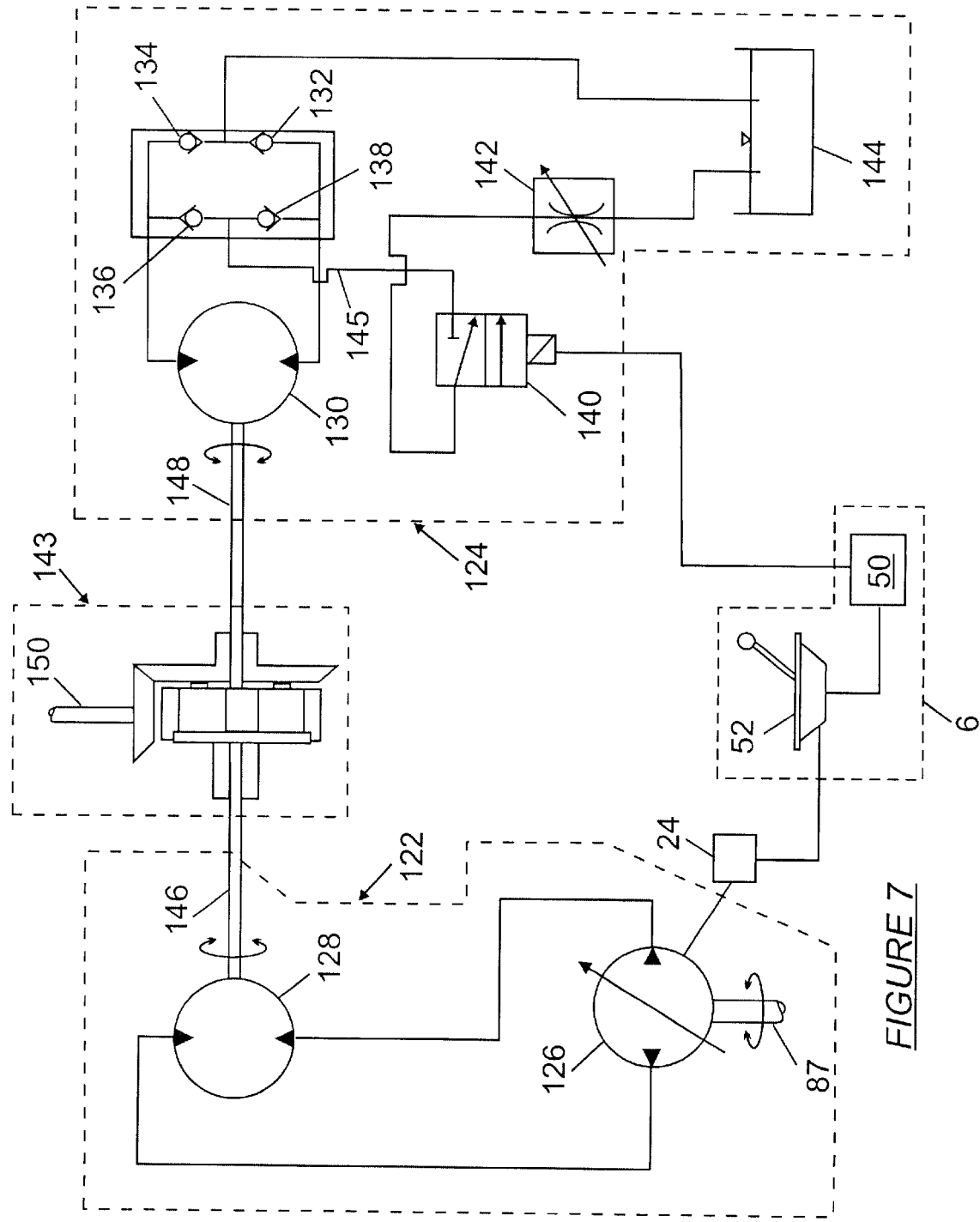
FIG. 7 is a circuit diagram of a hydrostatic transmission system according to another embodiment of the invention.

FIG. 7 shows a circuit diagram for a hydrostatic transmission system in accordance with yet another embodiment of the invention. The hydrostatic transmission system in this embodiment includes a closed-loop hydrostatic drive circuit 122 and an open-loop hydrostatic drive circuit 124. The closed-loop hydrostatic drive circuit 122 includes an hydraulic pump 126 and an hydraulic motor 128. The closed-loop hydrostatic drive circuit 122 is similar to the previously described closed-loop hydrostatic drive circuits 14, 16 (shown in FIG. 2). The open-loop hydrostatic drive circuit 124 includes an hydraulic pump 130, which is preferably a positive displacement pump but can also be a variable displacement pump, check valves 132–138, a control valve 140, and a variable flow restrictor 142. Check valves 132 and 134 permit fluid flow from a reservoir 144 to the effective intake port of hydraulic pump 130, but stop any flow from the effective discharge port of the pump 130 back to the reservoir 144, irrespective of the direction of rotation of the pump 130. Check valves 136 and 138 permit fluid flow from the hydraulic pump 130 to conduit 145. Although individual valves 132 and 134 are shown, these valves may be replaced by a three-way valve that would permit alternating connection of the intake port of the hydraulic pump 130 to the reservoir 144. The conduit 145 carries fluid from the effective discharge port of hydraulic pump 130 to the control valve 140. When the control valve 140 is open, fluid can be pumped from the hydraulic pump 130 to the flow restrictor 142. The flow restrictor 142 can be adjusted to control the rate at which fluid flows through the control valve 140.

The drive shaft 148 of the pump 130 is coupled to one input of differential 143, which may be similar to the differential 100 (shown in FIG. 5), couples the output shaft 146 of the hydraulic motor 128 to the input shaft 148 of the hydraulic pump 130. The hydraulic pump 130 may be a fixed-displacement pump, e.g., a hydraulic gear pump, although a variable-displacement pump could also be used. The rotary motion of the motor output shaft 146 drives the other input of the differential 143. When valve 140 is closed, the pump 130 cannot rotate. Rotation of shaft 146 will translate into proportional speed rotation of the differential output shaft 150. When valve 140 is open, the pump will rotate when a load is applied to differential output shaft 150 and the other differential input (shaft 146) is rotated by motor 128. Because the pump 130 is discharged through the variable restriction 142, the speed of rotation of the pump 130 will be determined in part by the setting on the restriction 142. The rotation of pump 130 provides an amount of speed "offset" between the inputs to the differential 143. This speed offset can provide a very low, or zero differential output speed, even while enabling motor 122 to operate above its minimum stable speed. The setting on variable restriction 142 can be selected to provide an appropriate degree of "offset" depending on the load applied to the differential output and any preferred operating speed of motor 128. When precision speed control is not required, as previously explained, valve 140 can be closed.

Figure 8:
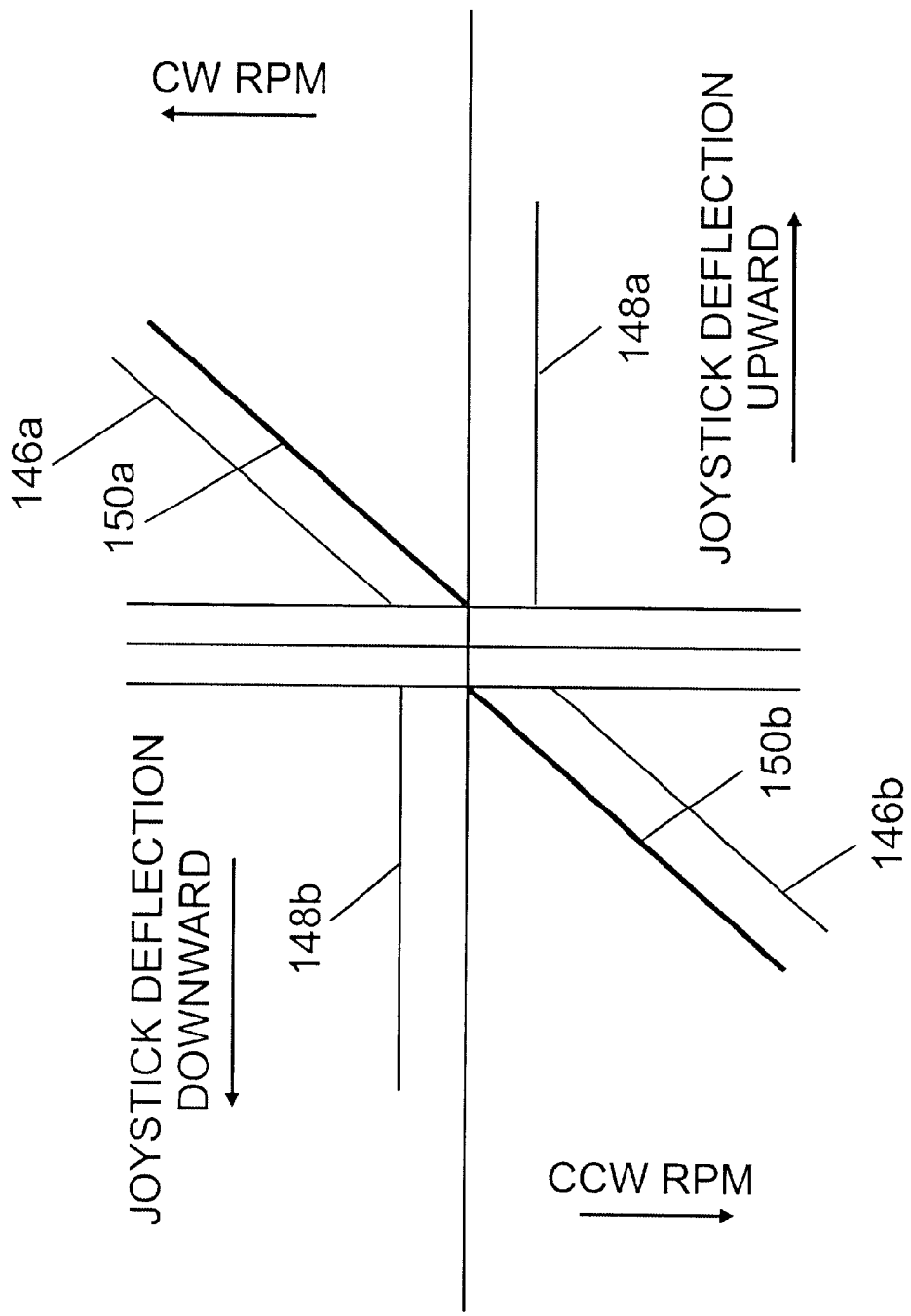
FIG. 8 shows an example of a control graph for the hydrostatic transmission system shown in FIG. 7.

FIG. 8 shows a control graph which describes the speeds of the hydrostatic drive circuits 122, 124, i.e., the speeds of the input shafts 146, 148, in the differential mode. Curves 146a, 146b represent the speeds of shaft 146 (shown in FIG. 7) curves 148a, 148b represent the speeds of shaft 148 (shown in FIG. 7) and curves 150a, 150b represent the speeds of the differential output shaft 150 (shown in FIG. 7). The speed curve 150a is the resultant of the speed curves 146a and 148a, and the speed curve 150b is the resultant of the speed curves 146b and 148b. The speed 148a (148b) of shaft 148 (shown in FIG. 7) is maintained substantially constant while the speed 146a (146b) of shaft 146 (shown in FIG. 7) is adjusted to control the speed 150a (150b) of the differential output shaft 150 (shown in FIG. 7). According to the control graph shown in FIG. 8, the shafts 146 and 148 (shown in FIG. 7) rotate in opposite directions, regardless of the direction in which the load (12 in FIG. 1) is traveling.

In general, the invention seeks to apply a selective speed and selected direction of rotation to the inputs of a differential, the output of which is coupled to drive a rotatable member. This arrangement will allow the motors or pumps of an hydrostatic transmission system to operate above their minimum stable speeds while allowing precise control of the rotation of the rotatable member at very low speeds, down to and including zero. Various embodiments have been described above, but those skilled in the art, having the benefit of this disclosure, will appreciate that other embodiments can be devised which do not depart from the spirit of the invention as disclosed herein. Accordingly, the scope of the invention shall be limited only by the attached claims.

What is claimed is:

1. A hydrostatic transmission system for applying a torque to a rotatable member, comprising:
   a differential having an output rotatably coupled with the rotatable member;
   a first hydrostatic drive rotatably coupled to a first input of the differential;
   a second hydrostatic drive rotatably coupled to a second input of the differential; and
   a control unit adapted to provide a selectable speed and selectable direction of rotation of each of the first and second hydrostatic drives, a rotational speed and direction of the output of the differential related to the algebraic sum of the rotational speeds and directions of the hydrostatic drives.

2. The hydrostatic transmission system of claim 1, wherein the first hydrostatic drive comprises a closed-loop hydrostatic drive.

3. The hydrostatic transmission system of claim 2, wherein the second hydrostatic drive comprises a closed-loop hydrostatic drive.

4. The hydrostatic transmission system of claim 3, wherein the first hydrostatic drive comprises a first pump hydraulically coupled to a first motor, and the second hydrostatic drive includes a second pump hydraulically coupled to a second motor.

5. The hydrostatic transmission system of claim 4, wherein the first pump and second pump comprise variable-displacement pumps.

6. The hydrostatic transmission system of claim 5, further comprising a device for controlling a volumetric flow rate of fluid transmitted from the pumps to the respectively connected motors.

7. The hydrostatic transmission system of claim 2, wherein the second hydrostatic drive comprises an open-loop hydrostatic drive.

8. The hydrostatic transmission system of claim 7, wherein the first hydrostatic drive comprises a first pump hydraulically coupled to a first motor.

9. The hydrostatic transmission system of claim 8, wherein the second hydrostatic drive comprises a second pump hydraulically coupled to a second motor through a directional control valve.

10. The hydrostatic transmission system of claim 8, wherein the second hydrostatic drive comprises a second pump hydraulically connected to a fluid reservoir by a valve, the second pump rotatably coupled to the second input of the differential.

11. The hydrostatic transmission system of claim 10, wherein the second hydrostatic drive further comprises a conduit for diverting fluid from the pump and a control valve for selectively permitting fluid flow through the conduit.

12. The hydrostatic transmission system of claim 11, further comprising a flow restrictor for adjusting a fluid flow rate through the conduit.

13. A method for driving a rotatable member, comprising:
controlling a first hydrostatic drive to rotate its output in a first selected direction and at a first selected speed;
controlling a second hydrostatic drive to rotate its output in a second selected direction and at a second selected speed, the outputs of the first and second hydrostatic drives coupled to respective inputs of a differential, the first and second selected speeds and directions selected such that the output of the differential drives the rotatable member at a third selected speed and direction of rotation.

14. The method of claim 13, wherein the first selected direction and the second selected direction are the same in a first mode, and the first selected direction and the second selected direction are opposite in a second mode.

15. The method of claim 13, wherein the speed of one of the first and second hydrostatic drives is maintained constant while the speed of the other one of the first and second hydrostatic drives is adjusted to control the rotational speed of the rotatable member.

16. The method of claim 15 wherein the first and second selected speeds are above a minimum stable speed threshold for each of the first and second hydrostatic drives.

17. The method as defined in claim 13 wherein the rotatable member comprises a winch having a well logging cable wound thereon, and wherein driving the rotatable member causes one selected from extending a logging cable into when the third direction is correspondingly selected, retracting the logging cable from the wellbore when the third direction is correspondingly selected, and maintaining the extension of the well logging cable.

18. A winch system, comprising:
a rotatably supported winch drum;
a differential having an output rotatably coupled to the drum;
a first hydrostatic drive having an output coupled to a first input of the differential;
a second hydrostatic drive having an output coupled to a second input of the differential; and
a control unit adapted to provide a selectable speed and direction of rotation of each of the first and second hydrostatic drives, a rotational speed and direction of the winch drum related to the algebraic sum of the rotational speeds and directions of the hydrostatic drives.

19. The winch system of claim 18, wherein the first hydrostatic drive comprises a closed-loop hydrostatic drive.

20. The winch system of claim 19, wherein the second hydrostatic drive comprises a closed-loop hydrostatic drive.

21. The winch system of claim 19, wherein the second hydrostatic drive comprises an open-loop hydrostatic drive.

22. The winch system of claim 21, wherein the second hydrostatic drive comprises a second pump hydraulically connected to a fluid reservoir by a valve, the second pump rotatably coupled to the second input of the differential.

23. The winch system of claim 22, wherein the second hydrostatic drive further comprises a conduit for diverting fluid from the second pump and a control valve for selectively permitting fluid flow through the conduit.

24. The winch system of claim 23, further comprising a flow restrictor for adjusting a fluid flow rate through the conduit.

25. The winch system of claim 18, wherein the first hydrostatic drive comprises a first pump hydraulically coupled to a first motor, and the second hydrostatic drive includes a second pump hydraulically coupled to a second motor.

26. The winch system of claim 25, wherein the first pump and second pump comprise variable-displacement pumps.

27. The winch system of claim 25, further comprising a device for controlling the volumetric flow rate of fluids transmitted from the pumps to the motors.

28. The winch system of claim 25, wherein the second pump is hydraulically coupled to the second motor through a directional control valve.

* * * * *